(12) United States Patent
Inaba et al.

(10) Patent No.: US 12,105,329 B2
(45) Date of Patent: Oct. 1, 2024

(54) OPTICAL CONNECTOR

(71) Applicant: SUMITOMO ELECTRIC OPTIFRONTIER CO., LTD., Yokohama (JP)

(72) Inventors: Takahiro Inaba, Yokohama (JP); Yoshikyo Tamekuni, Yokohama (JP); Mitsumasa Seita, Komaki (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 245 days.

(21) Appl. No.: 17/949,020

(22) Filed: Sep. 20, 2022

(65) Prior Publication Data
US 2023/0115918 A1    Apr. 13, 2023

(30) Foreign Application Priority Data
Oct. 8, 2021  (JP) ................................. 2021-166166

(51) Int. Cl.
*G02B 6/38* (2006.01)

(52) U.S. Cl.
CPC .................................. *G02B 6/3869* (2013.01)

(58) Field of Classification Search
CPC .. G02B 6/3869; G02B 6/3871; G02B 6/3878; G02B 6/3893
See application file for complete search history.

(56) References Cited

U.S. PATENT DOCUMENTS

| | | | |
|---|---|---|---|
| 6,287,018 B1 | 9/2001 | Andrews et al. | |
| 6,293,710 B1 | 9/2001 | Lampert et al. | |
| 8,419,294 B2 * | 4/2013 | Hyakutake | G02B 6/3869 |
| | | | 385/60 |

FOREIGN PATENT DOCUMENTS

| | | |
|---|---|---|
| JP | 2001-056420 A | 2/2001 |
| JP | 2001-147345 A | 5/2001 |
| JP | 2013-522679 A | 6/2013 |
| WO | 2011/116133 A1 | 9/2011 |

* cited by examiner

*Primary Examiner* — Omar R Rojas
(74) *Attorney, Agent, or Firm* — Oliff PLC

(57) ABSTRACT

An optical connector has a front end and a rear end in a first direction. The optical connector includes a ferrule that holds an optical fiber at the front end, and a front housing that accommodates the ferrule. The ferrule includes a flange portion having a regular hexagonal prism shape. The front housing has a through-hole into which the flange portion is inserted. The through-hole includes a first hole portion in which a cross section perpendicular to the first direction is a regular hexagonal shape, and a second hole portion that is continuous from the first hole portion. The second hole portion has a third end close to the front end, and a fourth end close to the rear end. In a cross section of the fourth end perpendicular to the first direction, six contours corresponding respectively to six sides of the third end bulge outward or inward.

8 Claims, 15 Drawing Sheets

OPTICAL CONNECTOR

CROSS-REFERENCE TO RELATED APPLICATIONS

This application is based upon and claims the benefit of the priority from Japanese Patent Application No. 2021-166166, filed on Oct. 8, 2021, the entire contents of which are incorporated herein by reference.

TECHNICAL FIELD

The present disclosure relates to an optical connector.

BACKGROUND

Japanese Unexamined Patent Publication No. 2001-56420, Japanese Unexamined Patent Publication No. 2001-147345, and Japanese Unexamined Patent Publication No. 2013-522679 disclose optical connectors. The optical connectors each includes a ferrule and a front housing that accommodates the ferrule.

SUMMARY

The present disclosure provides an optical connector which has a front end and a rear end located opposite the front end in a first direction, and into which an optical fiber is insertable from the rear end. The optical connector includes a ferrule that holds the optical fiber at the front end, and a front housing that accommodates the ferrule. The ferrule includes a flange portion having a regular hexagonal prism shape. The front housing has a through-hole into which the flange portion is inserted. The through-hole includes a first hole portion and a second hole portion that is continuous from the first hole portion. The second hole portion is located between the first hole portion and the rear end in the first direction. A shape of a cross section of the first hole portion perpendicular to the first direction is a regular hexagonal shape. The first hole portion has a first end close to the front end of the optical connector, and a second end close to the rear end of the optical connector. The first hole portion is continuously reduced in diameter from the second end toward the first end. A longest diagonal line at the first end of the first hole portion is shorter than a longest diagonal line of the flange portion. A longest diagonal line at the second end of the first hole portion is longer than the longest diagonal line of the flange portion. A distance between opposite sides at the second end of the first hole portion is shorter than the longest diagonal line of the flange portion. The second hole portion has a third end close to the front end of the optical connector, and a fourth end close to the rear end of the optical connector. A shape of a cross section of the third end of the second hole portion perpendicular to the first direction is the same as a shape of a cross section of the second end of the first hole portion perpendicular to the first direction. In a cross section of the fourth end of the second hole portion perpendicular to the first direction, six contours corresponding respectively to six sides of the third end of the second hole portion bulge outward or inward. A minimum diameter of the fourth end of the second hole portion is longer than the longest diagonal line of the flange portion. The second hole portion is continuously reduced in diameter from the fourth end toward the third end.

DETAILED DESCRIPTION

Figure 1:
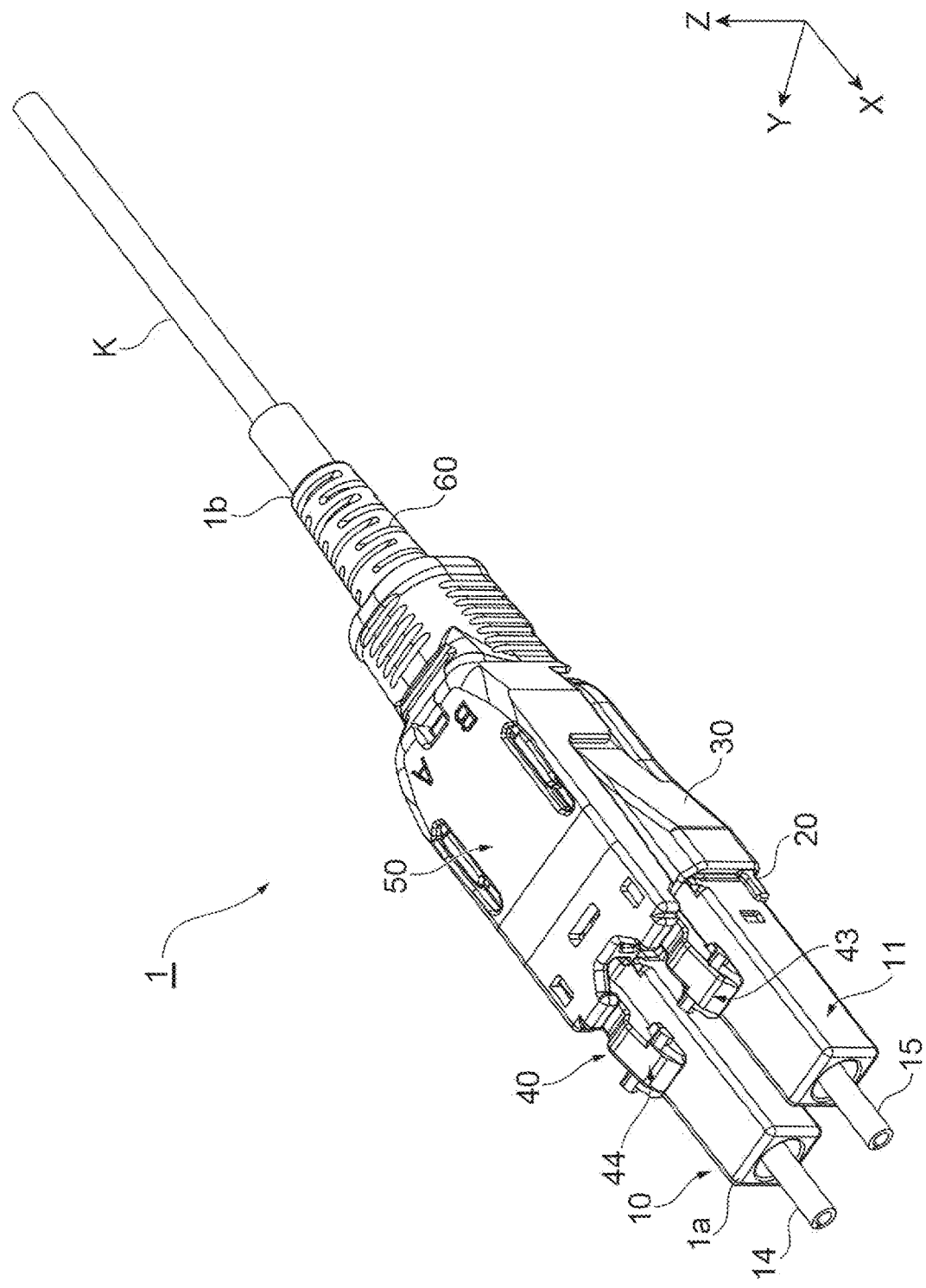
FIG. 1 is a perspective view illustrating an optical connector of one embodiment.

Problems to be Solved by the Present Disclosure

An optical connector described in Japanese Unexamined Publication No. 2001-56420 includes a ferrule including a flange that includes a hexagonal portion, and a housing including a hexagonal recessed portion. In the optical connector, when the flange of the ferrule is properly fitted to the recessed portion, the rotation of the ferrule is restricted. In addition, the rotation angle of the ferrule can be changed by rotating the ferrule in a state where the ferrule is pushed into the housing. Even when a center of a tip of an optical fiber is offset from a center line of the optical connector, the position of the center of the tip of the optical fiber can be brought close to the center line of the optical connector by changing the rotation angle of the ferrule.

Generally, a length of a longest diagonal line of a cross section of the flange perpendicular to an axial direction is longer than a distance between opposite sides of a cross section of the recessed portion perpendicular to the axial direction. For this reason, for example, corner portions of the hexagonal shape of the flange may be caught on side portions of the hexagonal shape of the recessed portion, so that the flange is not fitted to the recessed portion. Such a situation occurs, for example, when the optical connector is manufactured in a factory or the like, when the ferrule of the finished optical connector is pushed into the housing and is rotated and adjusted, when the ferrule is pushed into the housing in a case where the tip of the optical fiber is cleaned by a cleaner, or the like. In such a situation, since a state where the ferrule is retracted into the housing is maintained, a length of the ferrule protruding from the housing is shorter than a design value, so that the ferrule cannot contact a connection mating ferrule. Therefore, such a retracted state should be corrected, and it takes time and effort for this reason, which is a problem.

Effects of the Present Disclosure

According to the present disclosure, it is possible to provide the optical connector capable of reducing the frequency of occurrences of the retraction of the ferrule into the housing.

Explanation of Embodiments of the Present Disclosure

Initially, the contents of an embodiment of the present disclosure will be listed and described. An optical connector according to one embodiment is an optical connector which has a front end and a rear end located opposite the front end in a first direction, and into which an optical fiber is insertable from the rear end. The optical connector includes a ferrule that holds the optical fiber at the front end, and a front housing that accommodates the ferrule. The ferrule includes a flange portion having a regular hexagonal prism shape. The front housing has a through-hole into which the flange portion is inserted. The through-hole includes a first hole portion and a second hole portion that is continuous from the first hole portion. The second hole portion is located between the first hole portion and the rear end in the first direction. A shape of a cross section of the first hole portion perpendicular to the first direction is a regular hexagonal shape. The first hole portion has a first end close to the front end of the optical connector, and a second end close to the rear end of the optical connector. The first hole portion is continuously reduced in diameter from the second end toward the first end. A longest diagonal line at the first end of the first hole portion is shorter than a longest diagonal line of the flange portion. A longest diagonal line at the second end of the first hole portion is longer than the longest diagonal line of the flange portion. A distance between opposite sides at the second end of the first hole portion is shorter than the longest diagonal line of the flange portion. The second hole portion has a third end close to the front end of the optical connector, and a fourth end close to the rear end of the optical connector. A shape of a cross section of the third end of the second hole portion perpendicular to the first direction is the same as a shape of a cross section of the second end of the first hole portion perpendicular to the first direction. In a cross section of the fourth end of the second hole portion perpendicular to the first direction, six contours corresponding respectively to six sides of the third end of the second hole portion bulge outward or inward. A minimum diameter of the fourth end of the second hole portion is longer than the longest diagonal line of the flange portion. The second hole portion is continuously reduced in diameter from the fourth end toward the third end.

In the optical connector, a minimum diameter of the fourth end of the second hole portion is longer than the longest diagonal line of the flange portion. Therefore, when the flange portion passes through the fourth end of the second hole portion, the flange portion is smoothly inserted into the through-hole without coming into contact with the contours of the fourth end of the flange portion. In addition, the six contours of the fourth end corresponding respectively to the six sides of the third end of the second hole portion in a cross section perpendicular to the first direction bulge outward or inward, and the second hole portion is continuously reduced in diameter from the fourth end toward the third end. Therefore, when the flange portion is further inserted, an angle of the flange portion around a center axis changes along an inclined surface located between the six contours of the fourth end and the six sides of the third end. Accordingly, the positions of corners of a regular hexagonal shape of the flange portion are aligned with the positions of vertices of a regular hexagonal shape of the third end of the second hole portion. Therefore, when the optical connector is manufactured in a factory or the like, when the ferrule of the finished optical connector is pushed into the front housing and is rotated and adjusted, when the ferrule is pushed into the front housing in a case where a tip of the optical fiber is cleaned by a cleaner, or the like, the corners of the flange portion are prevented from being caught on the fourth end of the second hole portion when the ferrule is pulled forward from the front housing. As a result, the frequency of occurrences of the retraction of the ferrule is reduced. In addition, the shape of the cross section of the first hole portion perpendicular to the first direction is a regular hexagonal shape, the first hole portion is continuously reduced in diameter from the second end toward the first end, the longest diagonal line at the first end is shorter than the longest diagonal line of the flange portion, and the longest diagonal line at the second end is longer than the longest diagonal line of the flange portion. Therefore, in a state where the positions of the corners of the flange portion are aligned with the positions of vertices of the regular hexagonal shape of the cross section of the first hole portion perpendicular to the first direction, the flange portion is inserted into the first hole portion and is finally fitted to the first hole portion. Accordingly, the rotation of the flange portion around an axis of the through-hole is restricted.

The shape of the cross section of the fourth end of the second hole portion perpendicular to the first direction may be a circular shape. In this case, in the cross section of the fourth end of the second hole portion perpendicular to the first direction, a shape in which the six contours corresponding respectively to the six sides of the third end of the second hole portion bulge outward can be realized by a simple shape. Therefore, the ease of processing the housing can be improved.

The shape of the cross section of the fourth end of the second hole portion perpendicular to the first direction may be a substantially star shape. In this case, in the cross section of the fourth end of the second hole portion perpendicular to the first direction, a shape in which the six contours corresponding respectively to the six sides of the third end of the second hole portion bulge inward can be realized by a simple shape. Therefore, the ease of processing the housing can be improved.

Details of Embodiment of Present Disclosure

Specific examples of an embodiment of the present disclosure will be described below with reference to the drawings. It is intended that the present invention is not limited to the examples, but is interpreted by the appended claims and includes all changes made within the concept and scope equivalent to the appended claims. In the description of the drawings, the same elements are denoted by the same reference signs, and a duplicated description will not be repeated.

FIG. 1 is a perspective view illustrating an optical connector 1 according to one embodiment. As illustrated in FIG. 1, the optical connector 1 is a connector having a shape that is long in a longitudinal direction X (first direction), and has a front end 1a and a rear end 1b. The rear end 1b is located opposite the front end 1a in the longitudinal direction X. An optical cable K held by the optical connector 1 is inserted from the rear end 1b of the optical connector 1. A coating resin of two optical fibers (not illustrated) encapsulated in the optical cable K is removed inside the optical connector 1. The optical fibers are accommodated and held in two respective ferrules 14 and 15. The optical connector 1 is, for example, a duplex LC optical connector, and is a uniboot type optical connector. The optical connector 1 may be an optical connector having another configuration.

Figure 2:
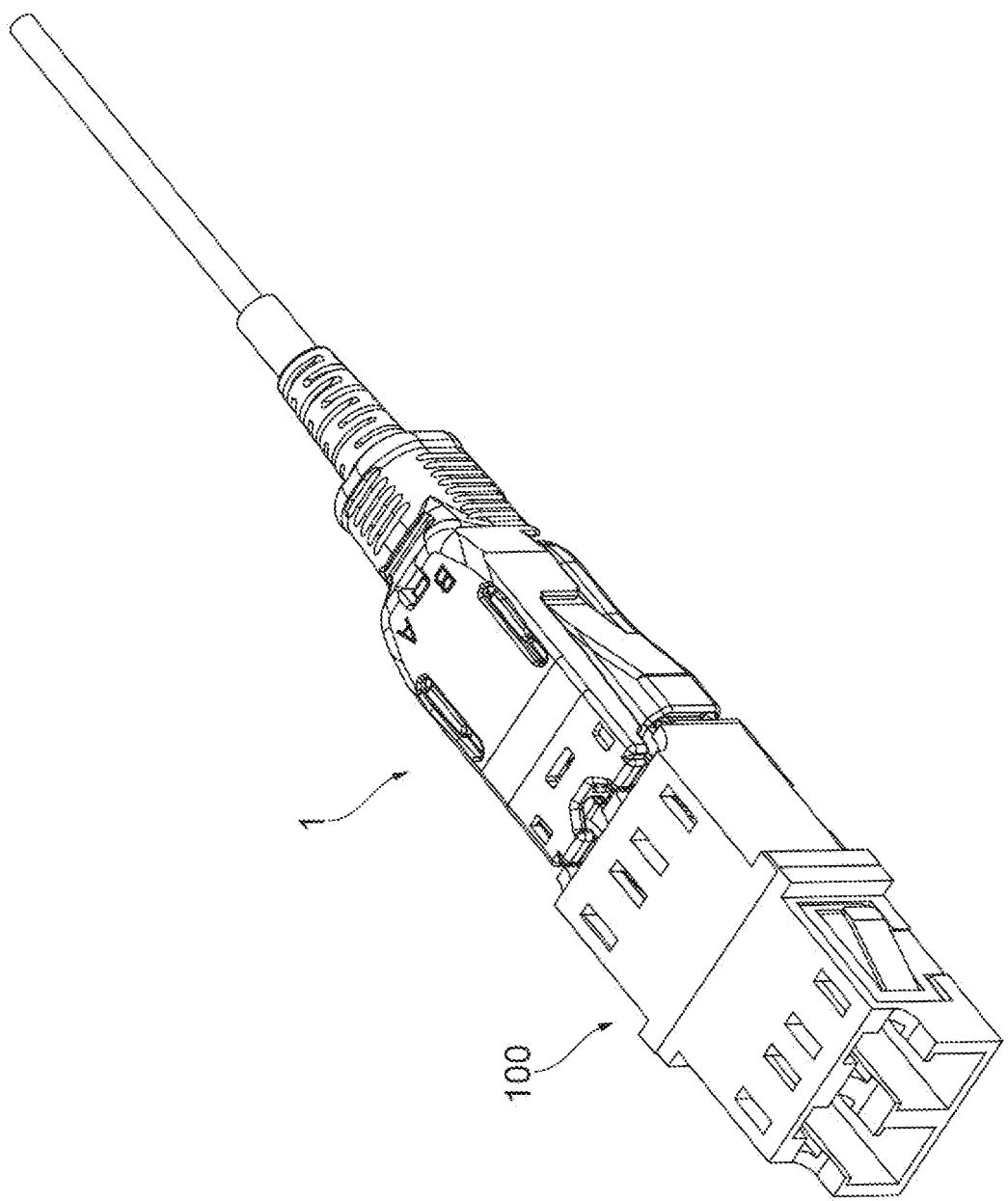
FIG. 2 is a perspective view illustrating a state where the optical connector illustrated in FIG. 1 is inserted into an attachment port of an adapter.

FIG. 2 is a perspective view illustrating a state where the optical connector 1 is inserted into an attachment port of an adapter 100 that is an external device. Another optical connector (not illustrated) is inserted into an attachment port on an opposite side of the adapter 100 from the optical connector 1. The optical connector 1 is optically coupled to the another optical connector by the adapter 100. The optical connector 1 may be configured to be inserted into a connecting portion of an optical transceiver or the like as an external device. In this case, the external device may be made of metal.

Figure 3:
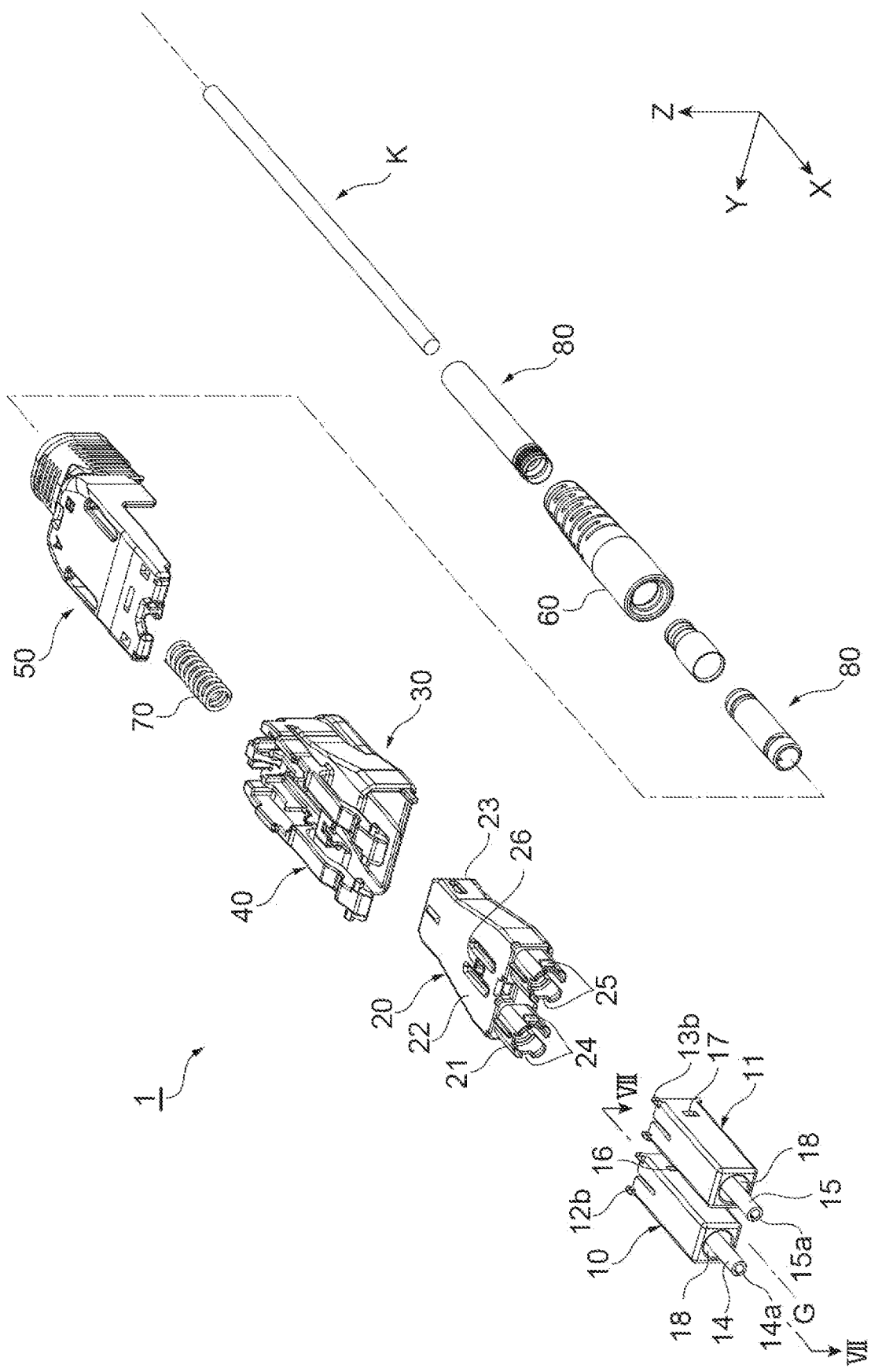
FIG. 3 is an exploded perspective view of the optical connector illustrated in FIG. 1.

FIG. 3 is an exploded perspective view of the optical connector illustrated in FIG. 1. As illustrated in FIGS. 1 and 3, the optical connector 1 includes two front housings 10 and 11, the ferrules 14 and 15, an inner housing 20, an outer housing 30, a latch 40, a tab 50, a boot 60, an elastic member 70, and a cable holding member 80.

Each of the front housings 10 and 11 is made of synthetic resin, and has a quadrangular prism outer shape inside which a through-hole 18 is provided. The front housing 10 accommodates the ferrule 14 capable of holding an optical fiber, in the through-hole 18 such that a front end 14a is exposed to the outside at the front end 1a of the optical connector 1. The front housing 11 accommodates the ferrule 15 capable of holding an optical fiber, in the through-hole 18 such that a front end 15a is exposed to the outside at the front end 1a of the optical connector 1. A tip of the held optical fiber is exposed from each of the front end 14a of the ferrule 14 and the front end 15a of the ferrule 15. The front end 14a of the ferrule 14 and the front end 15a of the ferrule 15 may be a plane that is parallel to an imaginary plane orthogonal to or intersecting the longitudinal direction X, or may be a plane that is inclined with respect to the imaginary plane. A more detailed configuration of the ferrules 14 and 15 will be described later.

Figure 7:
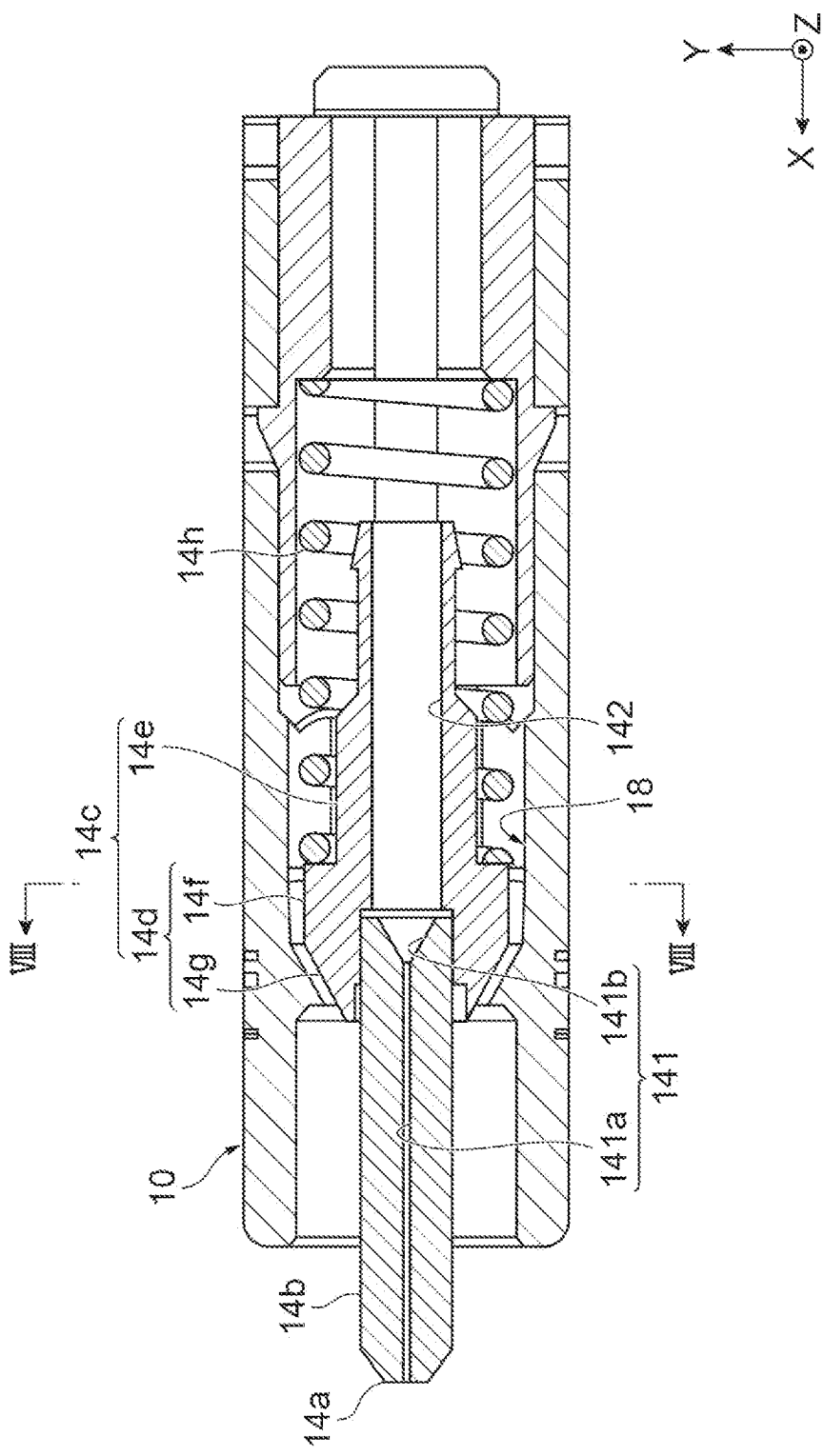
FIG. 7 is a cross-sectional view taken along line VII-VII of FIG. 3.
Figure 9:
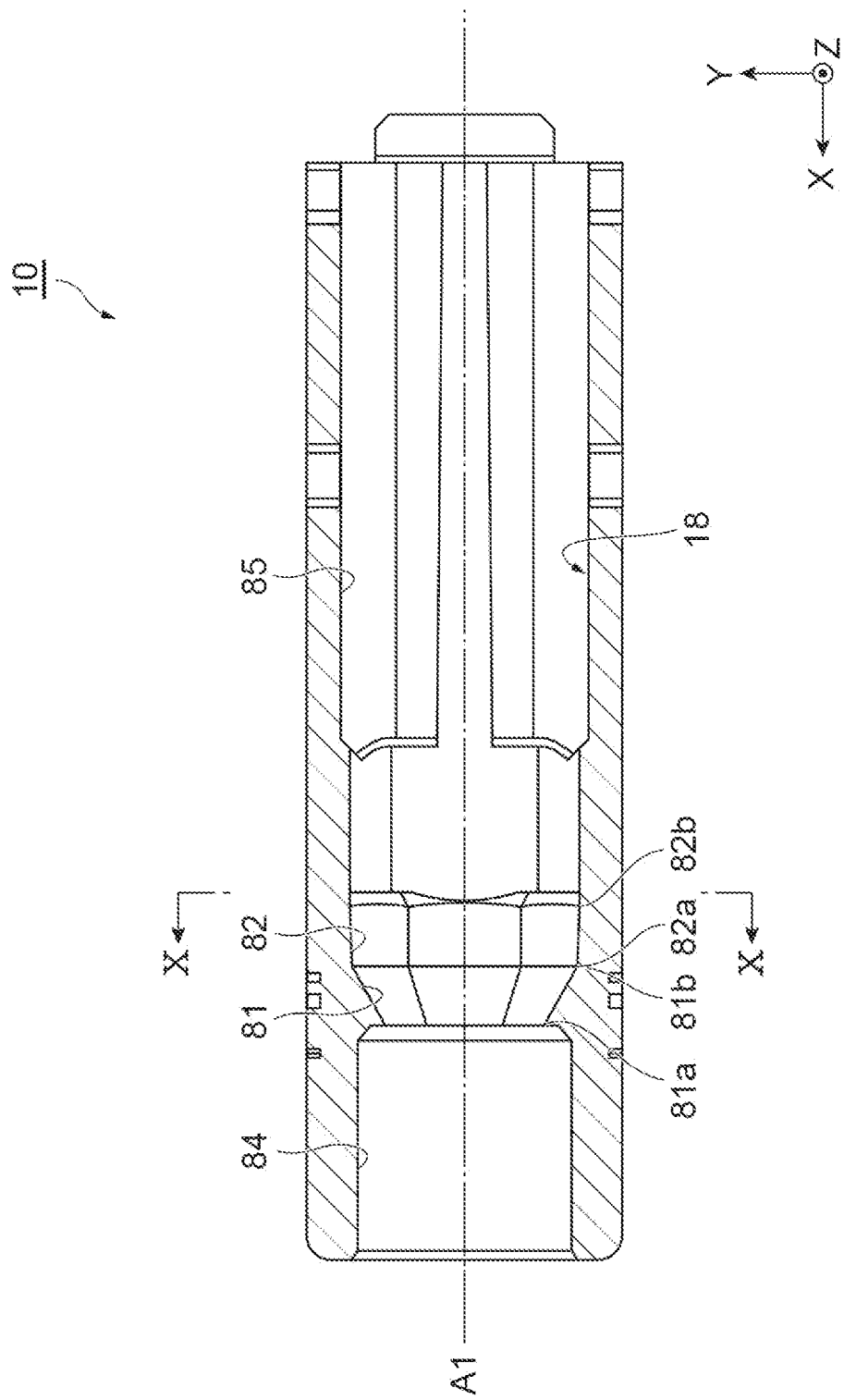
FIG. 9 is a cross-sectional view illustrating only a front housing among configurations illustrated in FIG. 7.

Projections 12b are provided at four corners of a rear end of the front housing 10. The projections 12b define a relative position between the front housing 10 and the inner housing 20 when the front housing 10 is connected to a front end of the inner housing 20. Projections 13b are provided at four corners of a rear end of the front housing 11. The projections 13b define a relative position between the front housing 11 and the inner housing 20 when the front housing 11 is connected to the front end of the inner housing 20. A pair of opening portions 16 each having a rectangular shape are provided in both respective side surfaces of the front housing 10. A pair of opening portions 17 each having a rectangular shape are provided in both respective side surfaces of the front housing 11. The through-hole 18 illustrated in FIGS. 7 and 9 is provided inside the front housing 10. The through-hole 18 having the same shape as that of the through-hole 18 inside the front housing 10 is also provided inside the front housing 11. A more detailed configuration of the through-hole 18 will be described later.

The inner housing 20 is a housing inside which spaces capable of accommodating optical fibers are formed, and is made of synthetic resin. The inner housing 20 includes a front end portion 21, a tapered portion 22, and a rear end portion 23, and is formed such that each space gradually expands from a rear end toward the front end. The inner housing 20 is a region for distributing the two optical fibers encapsulated in the optical cable K, to the ferrule 14 and the ferrule 15, and is connected to the rear ends of the front housings 10 and 11. The front end portion 21 of the inner housing 20 is provided with a pair of latches 24 and a pair of latches 25. The pair of latches 24 are inserted and engage with the pair of respective opening portions 16 of the front housing 10 from the inside The pair of latches 25 are inserted and engage with the pair of respective opening portions 17 of the front housing 11 from the inside. Accordingly, the front housings 10 and 11 are connected to the inner housing 20. A projection 26 is provided slightly in front of a center of each of a surface and a back surface of the inner housing 20. When the inner housing 20 is accommodated in the outer housing 30, one of the projection 26 provided on the surface of the inner housing 20 and the projection 26 provided on the back surface of the inner housing 20 engages with a hole provided on a lower surface 30b of the outer housing 30. Accordingly, the inner housing 20 is detachably connected to the inside of the outer housing 30. Each of the projections 26 has an inclined surface such that the inner housing 20 is attachable to and detachable from the outer housing 30.

Figure 4:
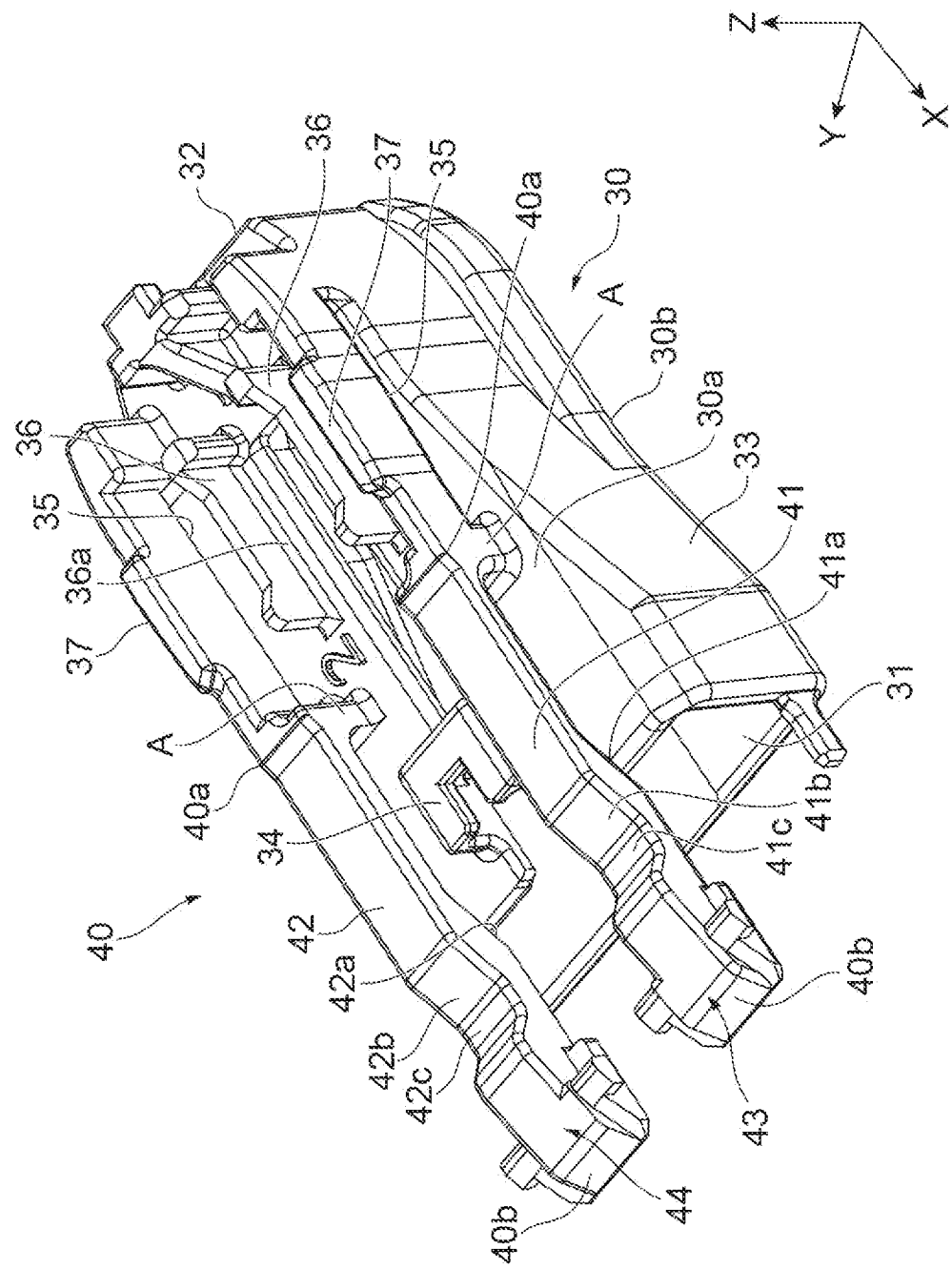
FIG. 4 is a perspective view illustrating an outer housing with a latch that is one component of the optical connector.

The outer housing 30 is a housing that accommodates the inner housing 20 inside and that is connected to the inner housing 20. FIG. 4 is a perspective view illustrating the outer housing 30 with a latch that is one component of the optical connector 1. As illustrated in FIG. 4, in the present embodiment, the outer housing 30 is made of synthetic resin to be integrated with the latch 40 to be described later. The present invention is not limited to this configuration, the outer housing 30 and the latch 40 may be formed separately from each other, and both may be connected by predetermined means such as bonding or fitting. In FIG. 4, the latch 40 is connected to the outer housing 30 at a connecting portion A. As illustrated in FIG. 4, the outer housing 30 includes a housing body 33 having an opening 31 in the front and an opening 32 in the rear.

A pair of wall portions 36 and a pair of guide projections 37 are provided on an upper surface 30a of the outer housing 30. The pair of wall portions 36 define a portion 36a thereinside, the portion 36a accommodating the elastic member 70. The pair of guide projections 37 are located outside the wall portions 36. The elastic member 70 accommodated in the portion 36a is disposed between the outer housing 30 and the tab 50 to be described later. The elastic member 70 functions to return the tab 50 to a normal position when the tab 50 is moved from the outer housing 30 toward the rear end 1b of the optical connector 1. The elastic member 70 is, for example, a spring. The guide projections 37 are guides that are located inside respective slits 55 and 56 (refer to FIG. 5) of the tab 50 in a state where the tab 50 is connected to the outer housing 30, to guide a movement of the tab 50 in the longitudinal direction X. The outer housing 30 further includes a protrusion portion 34 provided close to the front end and a slit 35 for connection provided below each of the guide projections 37, as a structure for connection to the tab 50. A hole and an opening portion are provided in the lower surface 30b of the outer housing 30. One projection 26 of the projection 26 provided on the surface of the inner housing 20 and the projection 26 provided on the back surface is inserted into the hole. Accordingly, the inner housing 20 is detachably connected to the outer housing 30.

The latch 40 includes members 41 and 42. The members 41 and 42 are provided on an outer side of the outer housing 30, and extend from a base end 40a at which the connecting portion A is located, toward the front end 1a along the longitudinal direction X. A tip portion 40b of the members 41 and 42 of the latch 40 is provided with engaging portions 43 and 44 capable of engaging with an external device such as the adapter 100. Each of the engaging portions 43 and 44 includes, for example, a pair of projections protruding in an outward direction orthogonal to the longitudinal direction X. The projections of the engaging portions 43 and 44 engage with respective engaging portions provided inside the adapter 100, so that the optical connector 1 is attached to the adapter 100. The tip portion 40b of the latch 40, namely, the engaging portions 43 and 44 are separated from the front housings 10 and 11 in a cantilever manner, respectively, in a normal state where the engaging portions 43 and 44 do not engage with the respective engaging portions provided in the adapter 100.

An inclined surface 41a, an inclined surface 41b, and a recessed portion 41c are provided in the vicinity of a center of the member 41 of the latch 40. An inclined surface 42a, an inclined surface 42b, and a recessed portion 42c are provided in the vicinity of a center of the member 42 of the latch 40. The inclined surfaces 41a and 42a are provided on a lower surface of the latch 40, namely, a surface facing the upper surface 30a of the outer housing 30. The inclined surfaces 41b and 42b are provided on an upper surface of the latch 40, and form a part of the recessed portions 41c and 42c. The members 41 and 42 of the latch 40 may be formed with a uniform thickness over the entirety of the members 41 and 42 in the longitudinal direction X. Alternatively, a plate thickness of the base end 40a of the members 41 and 42 of the latch 40 may be thinner than a plate thickness of portions of the members 41 and 42 at which the inclined surfaces 41a and 42a are located or a plate thickness of portions of the members 41 and 42 at which the inclined surfaces 41b and 42b are located. In that case, the tip portion 40b of the latch 40, namely, the engaging portions 43 and 44 move more smoothly in an up-down direction with the base end 40a as a fulcrum. The plate thickness referred to here means a thickness in a direction perpendicular to a plane at each location.

Figure 5:
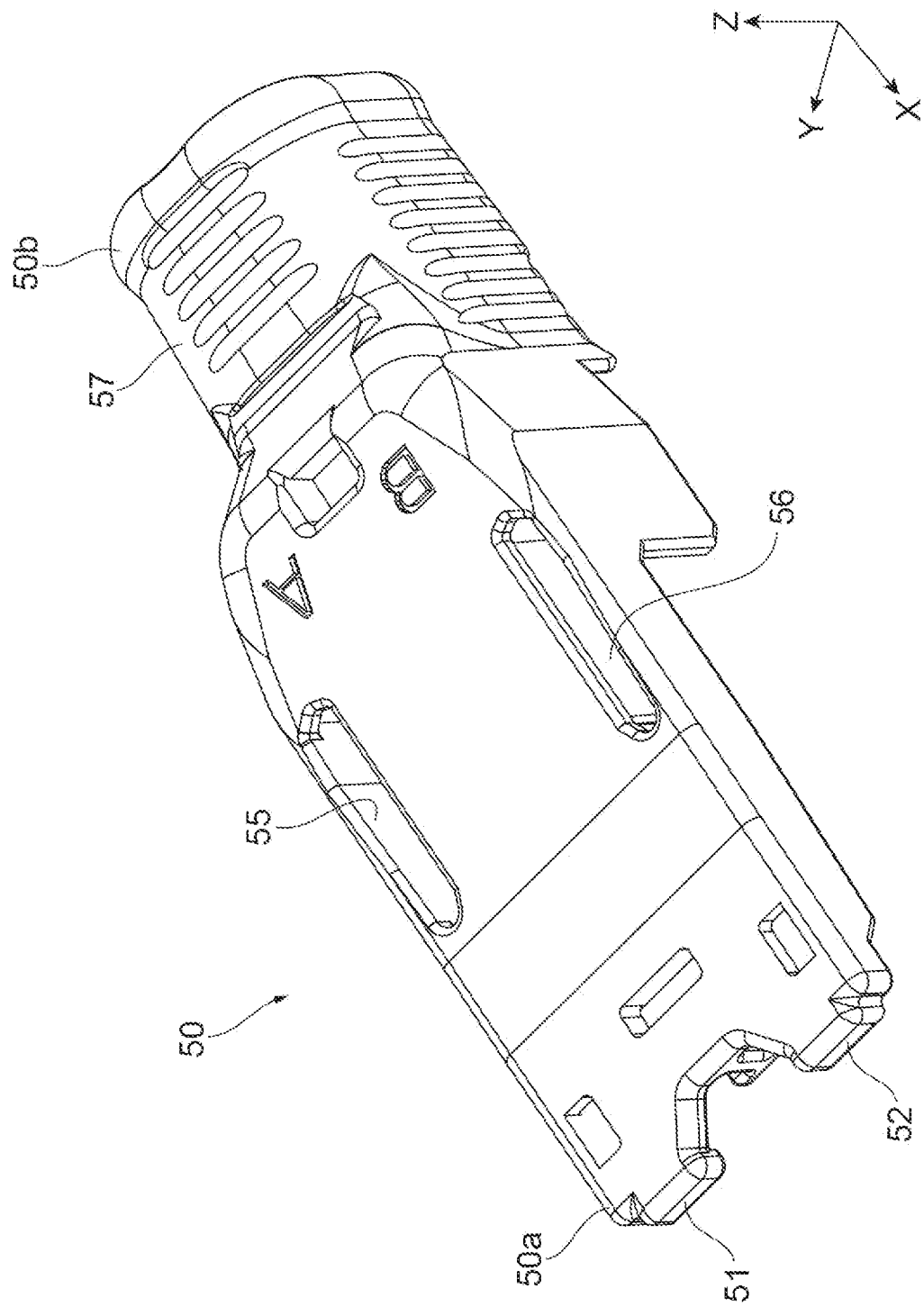
FIG. 5 is a perspective view illustrating a tab that is one component of the optical connector.
Figure 6:
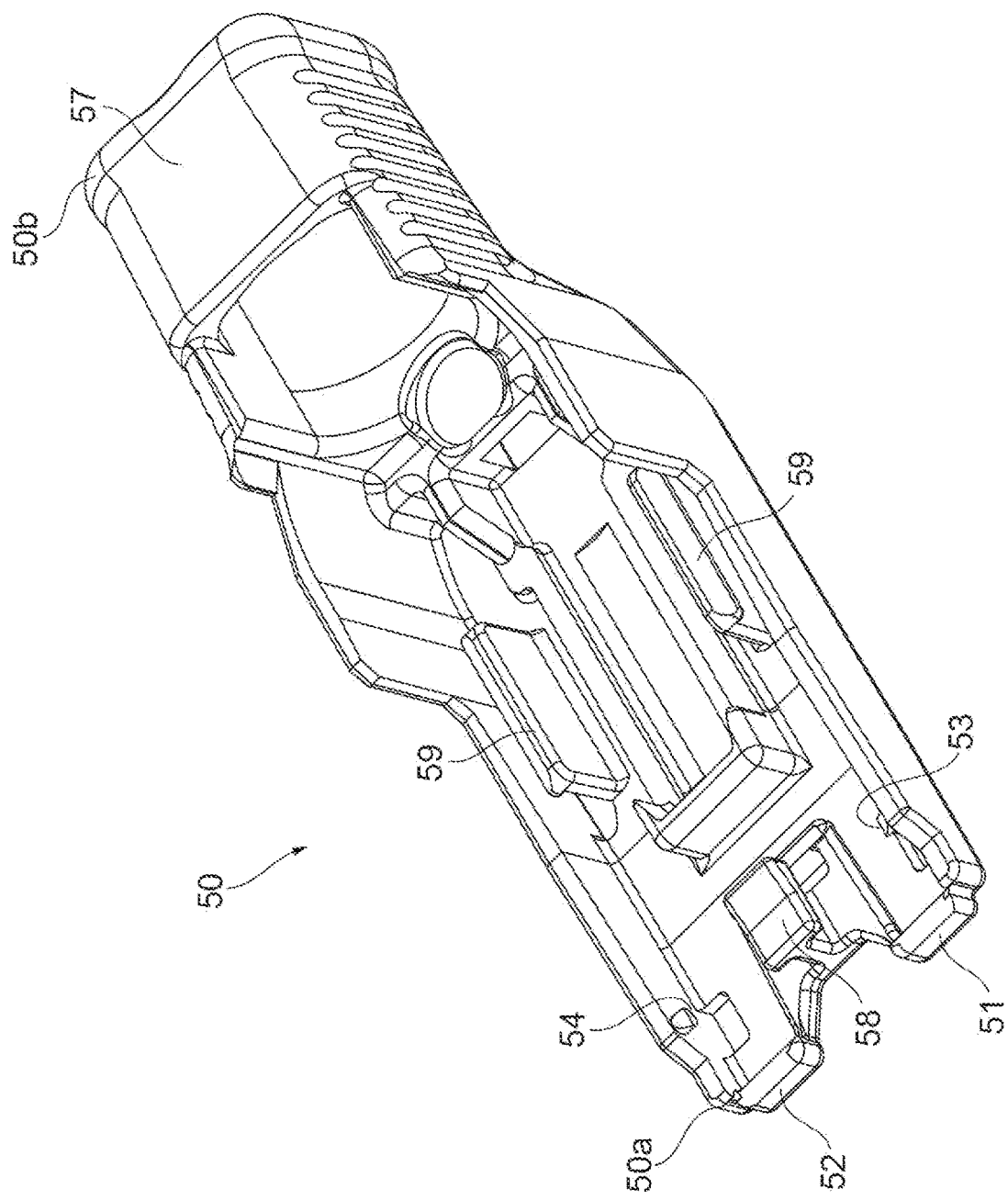
FIG. 6 is a perspective view of the tab illustrated in FIG. 5 when viewed from a reverse side of FIG. 5.

The tab 50 is disposed outside the latch 40 to cover portions of the latch 40 excluding the engaging portions 43 and 44 located at the tip portion 40b. FIG. 5 is a perspective view illustrating the tab 50 that is one component of the optical connector 1. FIG. 6 is a perspective view of the tab 50 illustrated in FIG. 5 when viewed from a reverse side of FIG. 5. As illustrated in FIGS. 5 and 6, the tab 50 includes a protrusion portion 58 provided on an inner side of a front end 50a, and a pair of latches 59 provided on the left and right of an inner side of the tab 50. The protrusion portion 58 is connected to the protrusion portion 34 (refer to FIG. 4) located on the upper surface 30a of the outer housing 30. The pair of latches 59 are caught in the respective slits 35 (refer to FIG. 4) from the inside, the slits 35 being located on the left and right of the upper surface 30a of the outer housing 30.

Accordingly, the tab 50 is connected to the outer housing 30 to be movable with respect to the outer housing 30 along the longitudinal direction X. The tab 50 is configured to push down the engaging portions 43 and 44 of the latch 40 toward the front housings 10 and 11, respectively, in response to a movement of the tab 50 from the front end 1a toward the rear end 1b along the longitudinal direction X, namely, a rearward movement. More specifically, projections 51 and 52 protruding downward are provided at the front end 50a of the tab 50. When the tab 50 moves rearward, the projections 51 and 52 move rearward along the inclined surfaces 41b and 42b of the latch 40, respectively. Accordingly, the engaging portions 43 and 44 of the latch 40 are pushed downward.

A pair of projections 53 and 54 are further provided on the inner side of the tab 50. The projections 53 and 54 are provided at positions where the projections 53 and 54 only slightly do not contact the lower surface of the latch 40 in a normal state. When the optical connector 1 is attached to the adapter 100, namely, when the engaging portions 43 and 44 of the latch 40 engage with the respective engaging portions of the adapter 100, if the engaging portions 43 and 44 of the latch 40 slightly move downward, the projections 53 and 54 contact the lower surface of the latch 40. Then, the engaging portions 43 and 44 of the latch 40 are pushed down toward the front housings 10 and 11 with contact points with the projections 53 and 54 as fulcrums, respectively.

A pair of the slits 55 and 56 are provided in a central portion of the tab 50. The guide projections 37 of the outer housing 30 described above are disposed in the respective slits 55 and 56. The guide projections 37 slide inside the respective slits 55 and 56 to guide a movement of the tab 50 along the longitudinal direction X. A grip portion 57 is provided at a rear end 50b of the tab 50. When the optical connector 1 attached to the adapter 100 is removed from the adapter 100, a user grips and pulls the grip portion 57 rearward, so that the projections 51 and 52 perform the above-described operation, and the engagement of the latch 40 is released. The grip portion 57 according to the present embodiment has a tubular shape that curves round such that the user can grip the grip portion 57 in both the up-down direction and a left-right direction. The present invention is not limited to this configuration, and may adopt a configuration in which the grip portion 57 can be gripped in one direction of the up-down direction and the left-right direction. The boot 60 to be described later is accommodated inside the grip portion 57.

FIG. 3 is referred to again. The boot 60 and the cable holding member 80 are members that introduce the optical cable K to the optical connector 1 and that fix the optical cable K at a predetermined position inside the optical connector 1. Accordingly, the optical fibers encapsulated in the optical cable K can be inserted from the rear end 1b of the optical connector 1. A part of the boot 60 and the cable holding member 80 are accommodated inside the outer housing 30 and the like.

In the optical connector 1, a structure in which the ferrule 14 is attached to the front housing 10 will be described with reference to FIG. 7. FIG. 7 is a cross-sectional view taken along line VII-VII of FIG. 3. The ferrule 14 extends in the longitudinal direction X in a state where the ferrule 14 is attached to the front housing 10. The ferrule 14 holds the optical fiber extending forward from the optical cable K. The optical fiber is exposed from the front end 14a of the ferrule 14. The ferrule 14 includes a ferrule body 14b and a metal member 14c. The ferrule body 14b is located close to front end 14a of the ferrule 14 in the longitudinal direction X. The metal member 14c is located close to a rear end of the ferrule 14. The ferrule body 14b is inserted and fixed to the metal member 14c.

A through-hole 141 extending in the longitudinal direction X is provided inside the ferrule body 14b. A cross section of the through-hole 141 perpendicular to the longitudinal direction X is a circular shape. The through-hole 141 includes a first portion 141a extending from the front end 14a of the ferrule body 14b toward the rear end, and a second portion 141b extending from the first portion 141a to a rear end of the ferrule body 14b. A diameter of the first portion 141a is slightly larger than an outer diameter of the optical fiber. A periphery of the optical fiber is supported by the first portion 141a, so that the optical fiber can be stably held. A diameter of a through-hole 142 provided in the metal member 14c is larger than the diameter of the first portion 141a. Therefore, the second portion 141b has a conical shape that is reduced in diameter from the rear end of the ferrule body 14b toward the first portion 141a.

Figure 8:
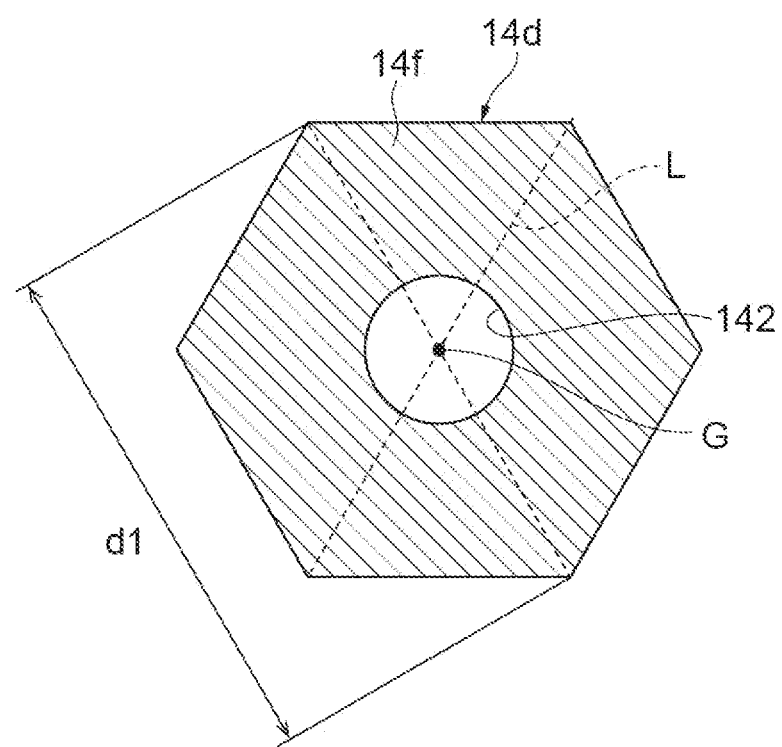
FIG. 8 is a view illustrating a cross section of a flange portion perpendicular to a longitudinal direction.

The metal member 14c includes a flange portion 14d and a hollow tubular portion 14e. The flange portion 14d is located close to a front end in the longitudinal direction X. The hollow tubular portion 14e is located close to a rear end in the longitudinal direction X, and is connected to the flange portion 14d. The flange portion 14d is inserted and held in the through-hole 18 of the front housing 10. The flange portion 14d includes a regular hexagonal prism-shaped portion 14f having a regular hexagonal prism shape, and a tapered portion 14g that is reduced in diameter from a front end of the regular hexagonal prism-shaped portion 14f toward the front end of the ferrule body 14b. A shape of a cross section of the tapered portion 14g perpendicular to the longitudinal direction X is, for example, a circular shape. FIG. 8 is a view illustrating a cross section of the regular hexagonal prism-shaped portion 14f of the flange portion 14d perpendicular to the longitudinal direction X. In the following description, a diameter dl of the regular hexagonal prism-shaped portion 14f refers to a distance between two vertices interposing an axis G of the flange portion 14d, among vertices included in a regular hexagonal shape of a cross section of the regular hexagonal prism-shaped portion 14f perpendicular to the longitudinal direction X. The through-hole 142 in which a cross section perpendicular to the longitudinal direction X is a circular shape is provided inside the metal member 14c. As illustrated in FIG. 7, the through-hole 142 has a diameter that is substantially equal to an outer diameter of the ferrule body 14b, at a portion close to a front end of the through-hole 142, and has a diameter smaller than the outer diameter of the ferrule body 14b, at the remaining portion close to a rear end of the through-hole 142.

One coated fiber that has branched from the optical cable K is inserted into the through-hole 142 of the metal member 14c. A diameter of the through-hole 142 is slightly larger than an outer diameter of the coated fiber. A periphery of the coated fiber is supported by the through-hole 142, so that the coated fiber is stably held. The front housing 10 includes an elastic member 14h provided around an axis of the hollow tubular portion 14e. The elastic member 14h is, for example, a compression coil spring. The elastic member 14h is sandwiched between a step provided between the flange portion 14d and the hollow tubular portion 14e and the front end portion 21 of the inner housing 20, to act a force to push the ferrule 14 forward in the longitudinal direction X.

Figure 10:
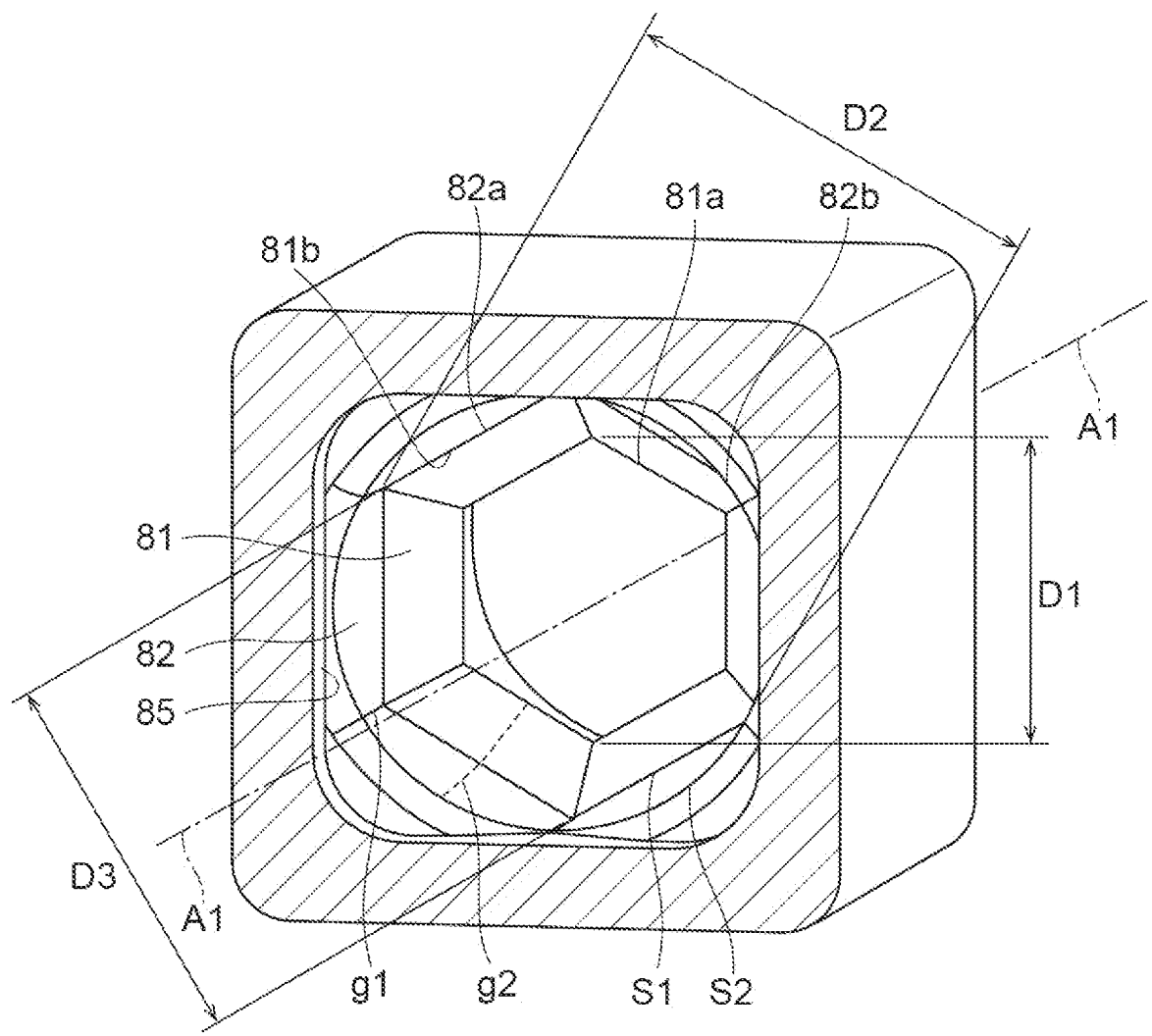
FIG. 10 is a cutaway perspective view cut along line X-X of FIG. 9.

FIG. 9 is a cross-sectional view illustrating only the front housing 10 among configurations illustrated in FIG. 7. FIG. 10 is a cutaway perspective view of the front housing 10 cut along line X-X of FIG. 9. As illustrated in FIGS. 9 and 10, the front housing 10 is provided with the through-hole 18 extending in the longitudinal direction X. The through-hole 18 includes a hole portion 84, a hole portion 81 (first hole portion), a hole portion 82 (second hole portion), and a hole portion 85 that extend along the longitudinal direction X. The hole portion 81 is located close to a front end of the through-hole 18, and the hole portion 82 is located between the hole portion 81 and a rear end of the through-hole 18, in other words, is located between the hole portion 81 and the rear end 1b of the optical connector 1. The hole portion 84 is located between the hole portion 81 and the front end of the through-hole 18. The hole portion 85 is located between the hole portion 82 and the rear end of the through-hole 18. The hole portion 81 and the hole portion 82 have the same axis A1. The hole portion 81 has an end 81a (first end) close to the front end 1a, and an end 81b (second end) close to the rear end 1b. The hole portion 82 has an end 82a (third end) close to the front end 1a, and an end 82b (fourth end) close to the rear end 1b. In the following description, the shapes of the end 81a, the end 81b, the end 82a, and the end 82b refer to the shapes of cross sections of the end 81a, the end 81b, the end 82a, and the end 82b perpendicular to the longitudinal direction X, respectively.

A cross section of the hole portion 81 perpendicular to the longitudinal direction X has a regular hexagonal shape. The hole portion 81 is continuously reduced in diameter from the end 81b toward the end 81a in the longitudinal direction X. In the present disclosure, a reduction in diameter refers to a reduction in the diameter of a cross section perpendicular to the longitudinal direction X from one end toward the other end in the longitudinal direction X, and refers to an overall reduction of contours of the cross section. For this reason, when a cross section and a cross section after the cross section is reduced in diameter are compared to each other, the cross section after being reduced in diameter is one size smaller than the cross section. The cross sections of the end 81a and the end 81b perpendicular to the longitudinal direction X have a regular hexagonal shape. A diameter D1 of the end 81a is smaller than a diameter D2 of the end 81b. The diameter D1 of the end 81a and the diameter D2 of the end 81b each refer to a distance between two vertices interposing the axis A1 of the hole portion 81, among vertices included in the regular hexagonal shape of the cross sections of the end 81a and the end 81b perpendicular to the longitudinal direction X. The diameter D1 of the end 81a is larger than a diameter of a front end of the tapered portion 14g and is smaller than the diameter dl of the front end of the regular hexagonal prism-shaped portion 14f. In other words, the diameter D1 of the end 81a is shorter than a longest diagonal line L of the flange portion 14d (refer to FIG. 8). The longest diagonal line L of the flange portion 14d refers to a line segment that connects two vertices interposing the axis G of the regular hexagonal prism-shaped portion 14f, among the vertices included in the regular hexagonal shape of the cross section of the regular hexagonal prism-shaped portion 14f perpendicular to the longitudinal direction X. Namely, a length of the longest diagonal line L of the flange portion 14d is equal to the diameter dl of the regular hexagonal prism-shaped portion 14f. The diameter D2 of the end 81b is larger than the diameter dl of the regular hexagonal prism-shaped portion 14f.

Namely, the diameter D2 of the end 81b is longer than the longest diagonal line L of the flange portion 14d. A distance D3 between opposite sides of the shape of the end 81b is shorter than the longest diagonal line L of the flange portion 14d.

The shape of each of the end 82a and the end 81b is a regular hexagonal shape. A diameter of the end 82a is equal to the diameter D2 of the end 81b. Namely, the shape and size of the end 82a are the same as the shape and size of the end 81b. Therefore, an inner wall of the hole portion 81 and an inner wall of the hole portion 82 are continuous with each other. The hole portion 82 is continuously reduced in diameter from the end 82b toward the end 82a in the longitudinal direction X. Six contours S2 at the end 82b corresponding respectively to six sides S1 at the end 82a bulge outward from the end 82b in a cross section perpendicular to the axis A1. In one example, the shape of the end 82b is a circular shape having a radius that is one size larger than a radius of a circumscribed circle with respect to the shape of the end 81b. A minimum diameter of the end 82b is longer than the longest diagonal line L of the flange portion 14d. A minimum diameter of the end 82b refers to a diameter of an inscribed circle with respect to the shape of the end 82b in a cross section of the end 82b perpendicular to the longitudinal direction X. Since the shape of the end 82b is a circular shape, the minimum diameter of the end 82b refers to the diameter of the end 82b. A generating line g1 is a generating line of the hole portion 82, the generating line extending from each of six vertices of the shape of the end 82a. An inclination angle of the generating line g1 of the hole portion 82 with respect to the axis A1 is the smallest among inclination angles of generating lines of the hole portion 82 with respect to the axis A1 of the hole portion 82. A generating line g2 is a generating line of the hole portion 82, the generating line extending from a center of each of six sides of the shape of the end 82a. An inclination angle of the generating line g2 of the hole portion 82 with respect to the axis A1 is the largest among inclination angles of generating lines of the hole portion 82 with respect to the axis A1 of the hole portion 82. The generating line of the hole portion 82 means a contour line of the hole portion 82 when the hole portion 82 is cut in a cross section that includes the axis A1 of the hole portion 82 and that is parallel to the axis A1 of the hole portion 82.

When the ferrule 14 is inserted into the through-hole 18, the ferrule body 14b, the tapered portion 14g, and the flange portion 14d are inserted into the through-hole 18 in order. At this time, the ferrule 14 is inserted into the through-hole 18 in a state where an axis of the ferrule 14, namely, the axis G of the flange portion 14d coincides with the axis A1 of the through-hole 18. Since the outer diameter of the ferrule body 14b is smaller than a distance between opposite sides of the end 81a, the ferrule body 14b passes through the hole portion 81 to protrude forward from the end 81a. Since a diameter of a rear end of the tapered portion 14g is smaller than the distance D3 between opposite sides of the end 82a, the tapered portion 14g can pass through the hole portion 82. Since the longest diagonal line L of the flange portion 14d is shorter than the minimum diameter of the end 82b (in the present embodiment, the diameter of the end 82b), the flange portion 14d can pass through the end 82b regardless of a rotation angle of the flange portion 14d around the axis A1. While the flange portion 14d is inserted into the hole portion 82, the hole portion 82 is gradually reduced in diameter. Since the distance D3 between opposite sides of the end 82a is shorter than the longest diagonal line L of the flange portion 14d, depending on the rotation angle of the flange portion 14d around the axis A1, corners of the flange portion 14d may contact a wall surface of the hole portion 82. Each of the corners of the flange portion 14d refers to a portion including each vertex of the regular hexagonal shape of the cross section of the regular hexagonal prism-shaped portion 14f perpendicular to the longitudinal direction X. When the corners of the flange portion 14d contact the wall surface of the hole portion 82, the flange portion 14d automatically rotates around the axis A1 along the wall surface (inclined surface) of the hole portion 82 due to a pressing force of the elastic member 14h, and the positions of the corners of the flange portion 14d are aligned with the positions of the vertices of the end 82a. Accordingly, the contact (catch) of the corners of the flange portion 14d with the wall surface of the hole portion 82 is eliminated. Thereafter, the tapered portion 14g comes into contact with the hole portion 81, so that the ferrule 14 stops. Specifically, the tapered portion 14g stops inside the hole portion 81 in a state where a cross section having a diameter equal to the diameter D1 of the end 81a among cross sections that are perpendicular to the longitudinal direction X and that are located between the front end and the rear end of the tapered portion 14g, and the end 81a overlap each other in the longitudinal direction X.

In the optical connector 1 having the above-described configuration, a structure in which the ferrule 15 is attached to the front housing 11 and an attachment operation are the same as the structure in which the ferrule 14 is attached to the front housing 10 and the attachment operation. Namely, a configuration of the ferrule 15 is the same as a configuration of the ferrule 14. A configuration of the front housing 11 is the same as a configuration of the front housing 10.

As described above, in the optical connector 1 according to the present embodiment, the minimum diameter of the end 82b is longer than the longest diagonal line L of the flange portion 14d. Therefore, when the flange portion 14d passes through the end 82b, the flange portion 14d is smoothly inserted into the hole portion 82 without coining into contact with the contours of the end 82b. In addition, the six contours S2 of the end 82b corresponding respectively to the six sides S1 of the end 82a bulge outward, and the hole portion 82 is continuously reduced in diameter from the end 82b toward the end 82a. Therefore, when the flange portion 14d is further inserted, the flange portion 14d rotates along the inclined surface located between the six contours S2 of the end 82b and the six sides S1 of the end 82a, so that the positions of the corners of the flange portion 14d are aligned with the positions of the vertices of the shape of the end 82a. Therefore, when the optical connector 1 is manufactured in a factory or the like, when the ferrule 14 of the finished optical connector 1 is pushed into the front housing 10 and is rotated and adjusted, when the ferrule 14 is pushed into the front housing 10 in a case where the tip of the optical fiber is cleaned by a cleaner, or the like, the corners of the flange portion 14d are prevented from being caught on the end 82b of the hole portion 82 when the ferrule 14 is pulled forward from the front housing 10. As a result, the frequency of occurrences of the retraction of the ferrule 14 is reduced. In addition, the shape of the cross section of the hole portion 81 perpendicular to the longitudinal direction X is a regular hexagonal shape, the hole portion 81 is continuously reduced in diameter from the end 81b toward the end 81a, the diameter D1 of the end 81a is shorter than the longest diagonal line L of the flange portion 14d, and the diameter D2 of the end 81b is longer than the longest diagonal line L of the flange portion 14d. Therefore, in a state where the positions of the corners of the flange portion 14d are aligned with the positions of vertices of the regular hexagonal shape of the cross section of the hole portion 81 perpendicular to the longitudinal direction X, the flange portion 14d is inserted into the hole portion 81 and is finally fitted to the hole portion 81. Accordingly, the rotation of the flange portion 14d around an axis of the through-hole 18 is restricted. In the optical connector 1, since the shape of the cross section of the end 82b perpendicular to the longitudinal direction X is a circular shape, a shape in which the six contours S2 corresponding respectively to the six sides S1 of the end 82a bulge outward can be realized by a simple shape. Therefore, the ease of processing the front housing 10 can be improved. Even when the ferrule 15 is attached to the front housing 11, the same effects as all the above-described effects are obtained.

Modification Examples

Figure 11:
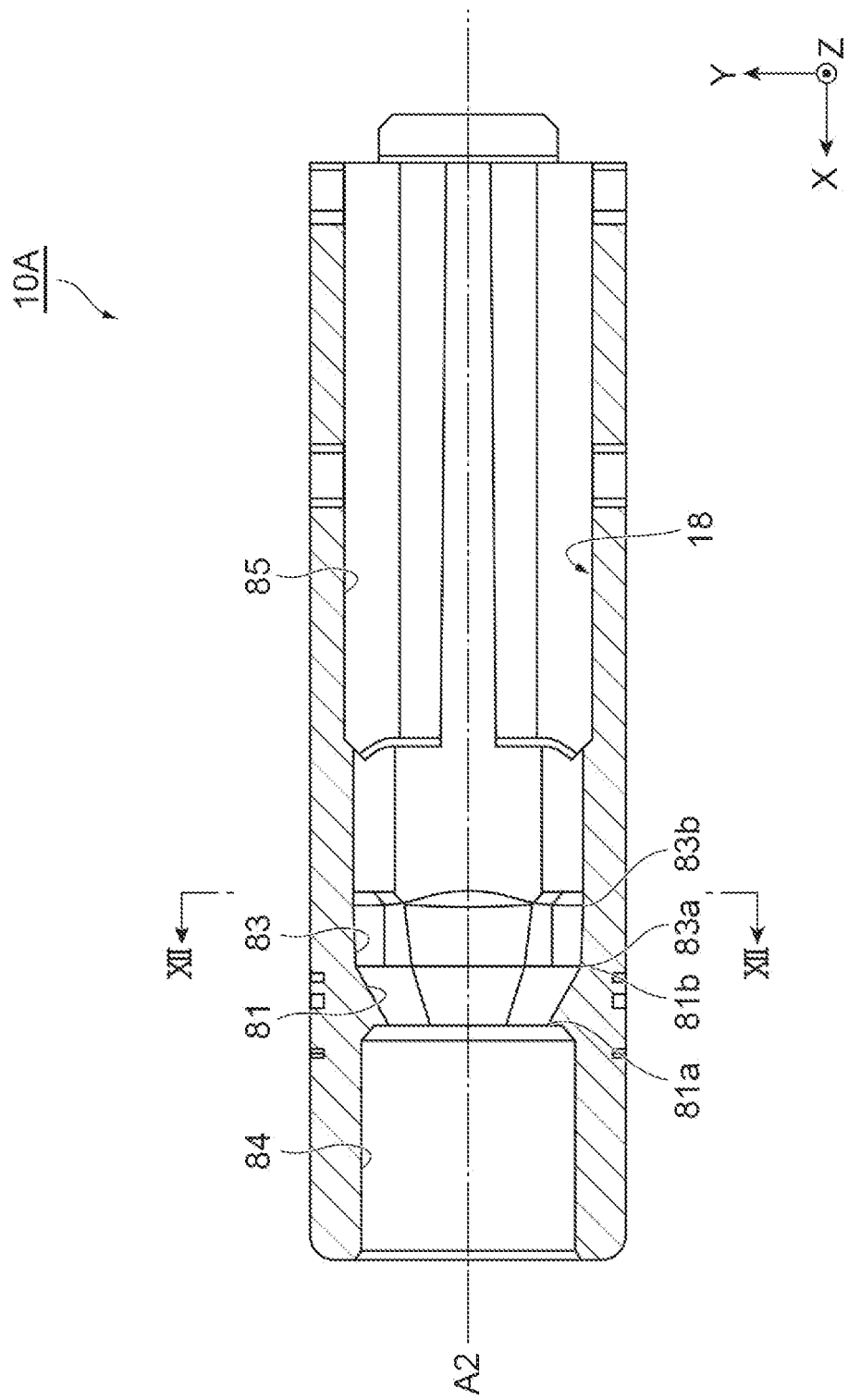
FIG. 11 is a cross-sectional view illustrating a configuration of a front housing according to a modification example.
Figure 12:
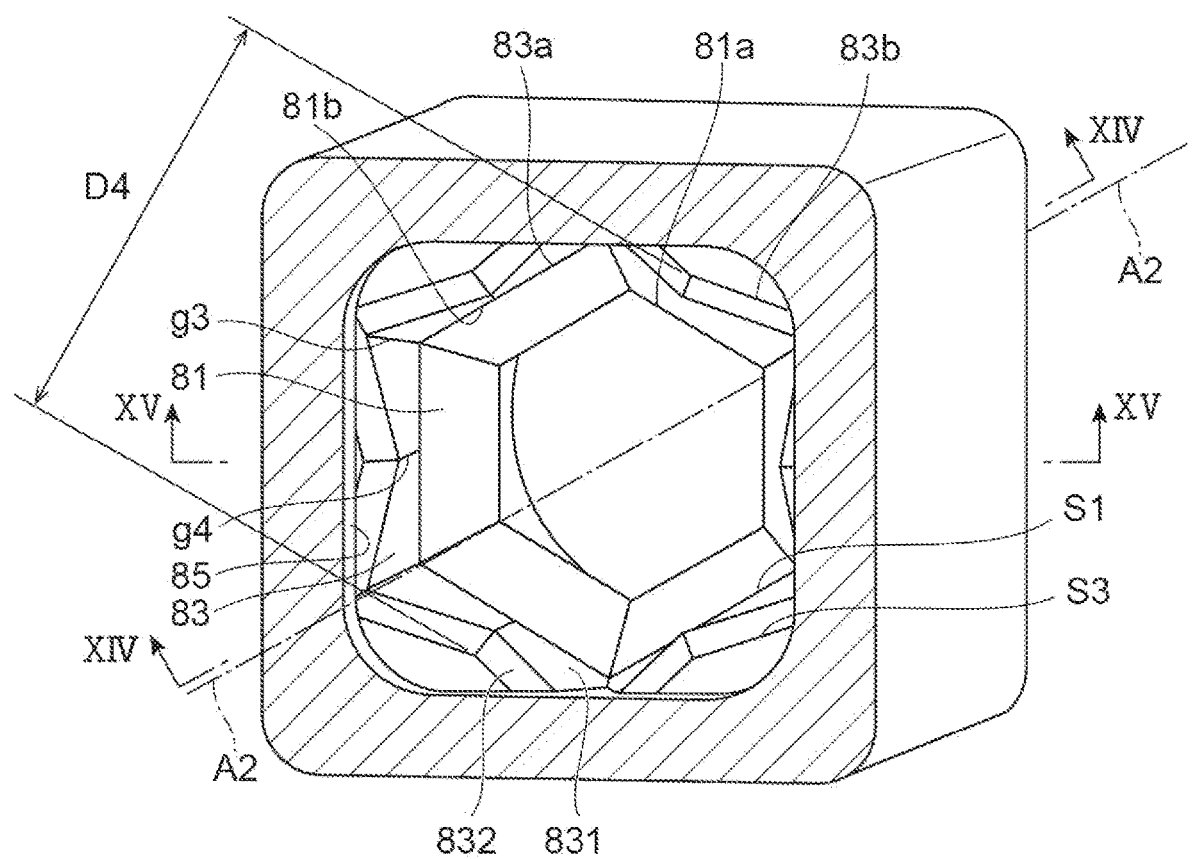
FIG. 12 is a cutaway perspective view cut along line XII-XII of FIG. 11.
Figure 12:
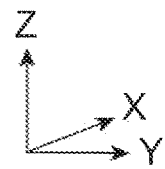

FIG. 11 is a cross-sectional view illustrating a configuration of a front housing 10A according to a modification example of the embodiment. FIG. 12 is a cutaway perspective view of the front housing 10A cut along line XII-XII of FIG. 11. In the front housing 10A according to the modification example, a shape of a front end portion of the through-hole 18 is mainly different from that of the embodiment. The through-hole 18 of the front housing 10A according to the modification example includes a hole portion 83 instead of the hole portion 82 according to the embodiment.

As illustrated in FIGS. 11 and 12, the front housing 10A is provided with the through-hole 18 extending in the longitudinal direction X. The through-hole 18 includes the hole portion 84, the hole portion 81 (first hole portion), the hole portion 83 (second hole portion), and the hole portion 85 that extend along the longitudinal direction X. The hole portion 81 is located close to the front end of the through-hole 18, and the hole portion 83 is located between the hole portion 81 and the rear end of the through-hole 18, in other words, is located between the hole portion 81 and the rear end 1b of the optical connector 1. The hole portion 84 is located between the hole portion 81 and the front end of the through-hole 18. The hole portion 85 is located between the hole portion 83 and the rear end of the through-hole 18. The hole portion 81 and the hole portion 83 have the same axis A2. The hole portion 81 has the end 81a (first end) close to the front end 1a, and the end 81b (second end) close to the rear end 1b. The hole portion 83 has an end 83a (third end) close to the front end 1a, and an end 83b (fourth end) close to the rear end 1b. In the following description, the shapes of the end 83a and 83b refer to the shapes of cross sections of the end 83a and 83b perpendicular to the longitudinal direction X, respectively. A configuration of the hole portion 81 is the same as that of the embodiment.

Figure 13:
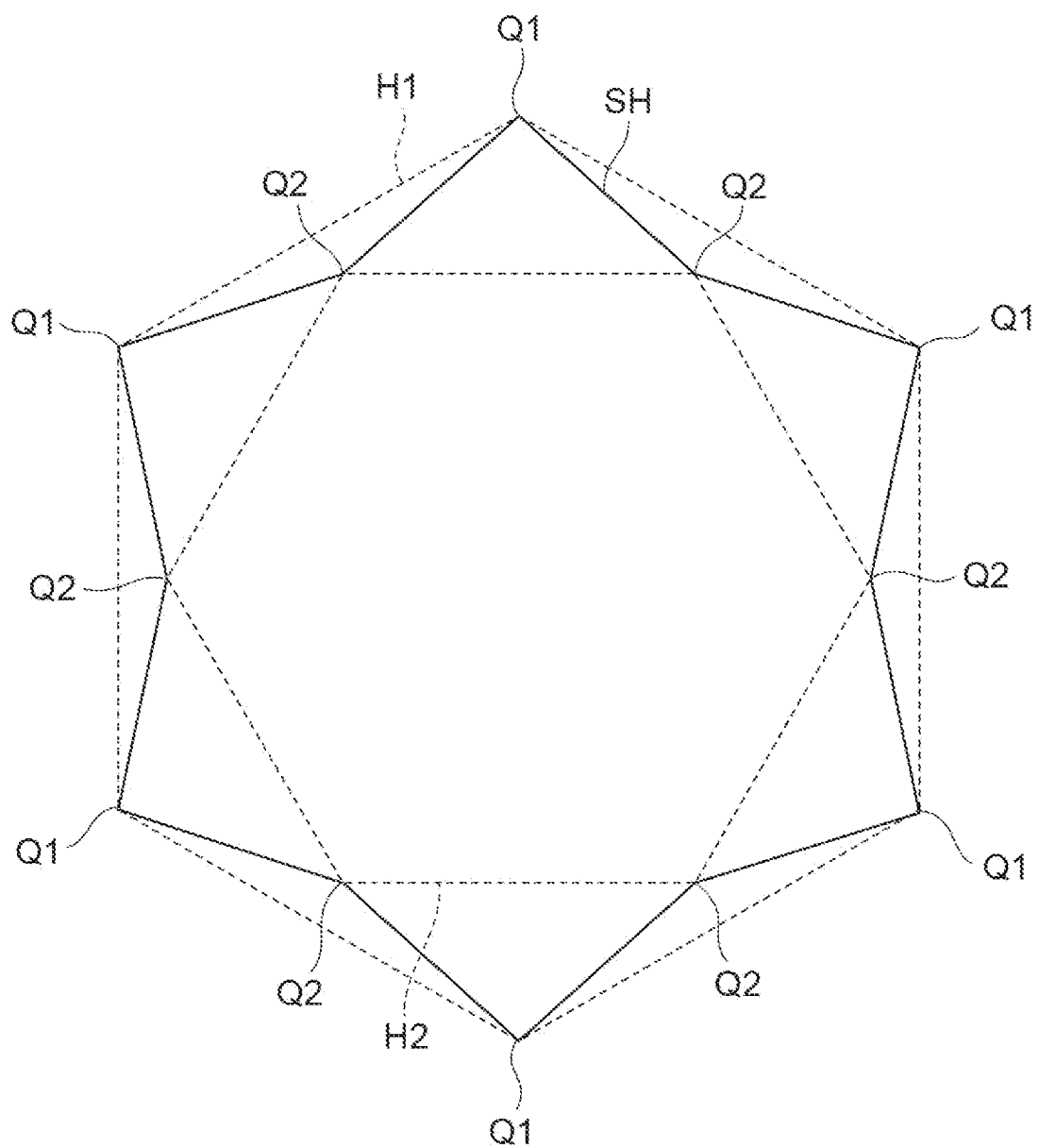
FIG. 13 is a view illustrating a hexagram.

The shape of the end 83a is a regular hexagonal shape. A diameter of the end 83a is equal to the diameter D2 of the end 81b (refer to FIG. 10). Namely, the shape and size of the end 83a are the same as the shape and size of the end 81b. Therefore, an inner wall of the hole portion 81 and an inner wall of the hole portion 83 are continuous with each other. The hole portion 83 is continuously reduced in diameter from the end 83b toward the end 83a in the longitudinal direction X. Six contours S3 at the end 83b corresponding respectively to six sides S1 of the end 83a bulge inward from the end 83b in a cross section perpendicular to the axis A2. In one example, the end 83b has a substantially star shape. However, the star shape may not necessarily be a strict star shape, and for example, the vertices of the star shape may be crushed. FIG. 13 is a view illustrating a hexagram SH. The hexagram SH has six vertices Q1 and six vertices Q2. The six vertices Q1 correspond to vertices of an outer regular hexagonal shape H1.

Figure 14:
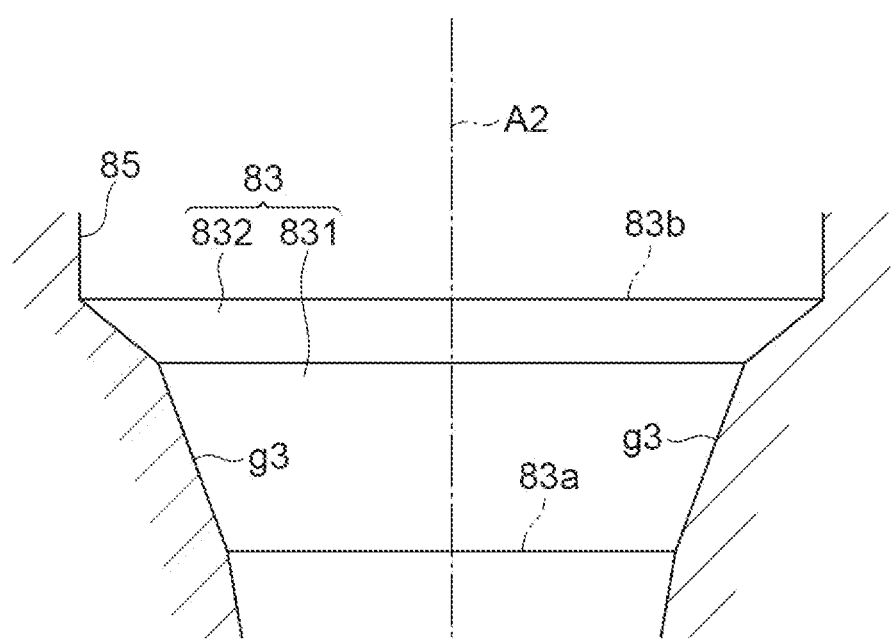
FIG. 14 is a view schematically illustrating a cross section taken along line XIV-XIV of FIG. 12.
Figure 15:
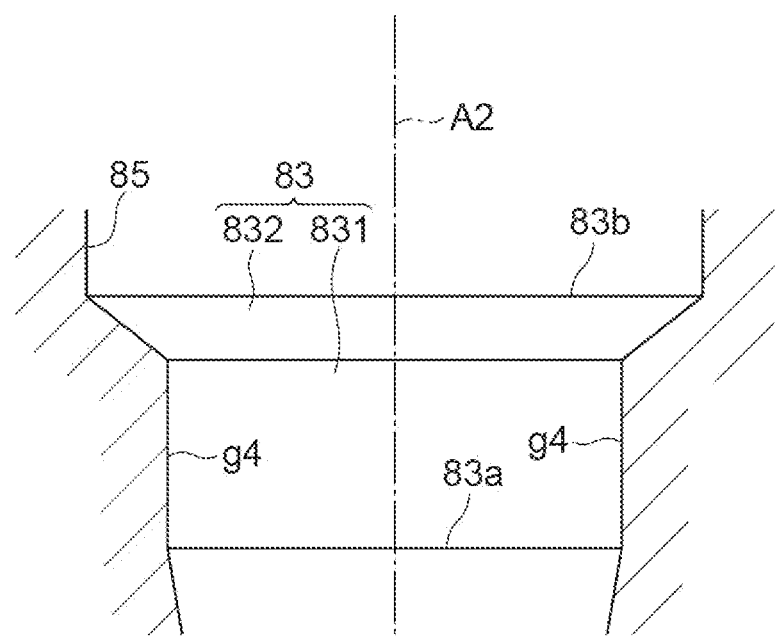
FIG. 15 is a view schematically illustrating a cross section taken along line XV-XV of FIG. 12.

The six vertices Q2 correspond to vertices of an inner regular hexagonal shape H2 that is a regular hexagonal shape smaller than the outer regular hexagonal shape H1 and that is rotated 30° around a center axis with respect to the outer regular hexagonal shape H1. The hexagram SH has a shape in which the vertices Q1 and Q2 are connected to each other by a straight line. The end 83b has a shape in which each of the vertices Q1 of the hexagram SH illustrated in FIG. 13 is crushed by the hole portion 85. A minimum diameter D4 of the end 83b illustrated in FIG. 12 is longer than the longest diagonal line L of the flange portion 14d. The minimum diameter D4 corresponds to a distance between two vertices Q2 of the hexagram SH that face each other with the center axis interposed therebetween. The hole portion 83 of the modification example is reduced in diameter in two stages. Namely, the hole portion 83 includes a first portion 831 including the end 83a, and a second portion 832 including the end 83b. The first portion 831 and the second portion 832 are arranged in a direction along the axis A2, and are connected to each other. FIG. 14 is a view schematically illustrating a cross section taken along line XIV-XIV of FIG. 12. FIG. 14 illustrates a cross section that includes two vertices of the end 83b corresponding to two facing vertices Q1 of the hexagram SH and that is parallel to the axis A2. FIG. 15 is a view schematically illustrating a cross section taken along line XV-XV of FIG. 12, and illustrates a cross section that includes two vertices of the end 83b corresponding to two facing vertices Q2 of the hexagram SH and that is parallel to the axis A2. As illustrated in FIG. 14, an inclination angle of a generating line g3 of the hole portion 83 that extends from each vertex of the end 83b corresponding to the vertex Q1 is inclined with respect to the axis A2 at both the first portion 831 and the second portion 832. At the first portion 831, the inclination angle of the generating line g3 with respect to the axis A2 is the largest among inclination angles of generating lines with respect to the axis A2. As illustrated in FIG. 15, an inclination angle of a generating line g4 of the hole portion 83 that extends from each vertex of the end 83b corresponding to the vertex Q2 is inclined or parallel to the axis A2 at the first portion 831, and is inclined with respect to the axis A2 at the second portion 832. At the first portion 831, the inclination angle of the generating line g4 with respect to the axis A2 is the smallest among inclination angles of generating lines with respect to the axis A2. The generating line of the hole portion 83 means a contour line of the hole portion 83 when the hole portion 83 is cut in a cross section that includes the axis A2 of the hole portion 83 and that is parallel to the axis A2 of the hole portion 83. As illustrated in FIGS. 14 and 15, an inclination angle of the second portion 832 with respect to the axis A2 is larger than an inclination angle of the first portion 831 with respect to the axis A2.

When the ferrule 14 is inserted into the through-hole 18, the ferrule body 14b, the tapered portion 14g, and the flange portion 14d are inserted into the through-hole 18 in order. At this time, the ferrule 14 is inserted into the through-hole 18 in a state where the axis of the ferrule 14, namely, the axis G of the flange portion 14d coincides with the axis A2 of the through-hole 18. Since the outer diameter of the ferrule body 14b is smaller than a distance between opposite sides of the end 81a, the ferrule body 14b passes through the hole portion 81 to protrude forward from the end 81a. Since the diameter of the rear end of the tapered portion 14g is smaller than the distance D3 between opposite sides of the end 83a, the tapered portion 14g can pass through the hole portion 83. Since the longest diagonal line L of the flange portion 14d is shorter than the minimum diameter D4 of the end 83b, the flange portion 14d can pass through the end 83b regardless of a rotation angle the flange portion 14d around the axis. While the flange portion 14d is inserted into the hole portion 83, the hole portion 83 is gradually reduced in diameter. Since the distance between opposite sides of the end 83a is shorter than the longest diagonal line L of the flange portion 14d, depending on the rotation angle of the flange portion 14d around the axis A2, the corners of the flange portion 14d may contact a wall surface of the hole portion 83. When the corners of the flange portion 14*d* contact the wall surface of the hole portion 83, the flange portion 14*d* automatically rotates around the axis A2 according to the wall surface (inclined surface) of the hole portion 83 due to a pressing force of the elastic member 14*h*, and the positions of the corners of the flange portion 14*d* are aligned with the positions of vertices of the end 83*a*. Accordingly, the contact (catch) of the corners of the flange portion 14*d* with the wall surface of the hole portion 83 is eliminated. Thereafter, the tapered portion 14*g* comes into contact with the hole portion 81, so that the ferrule 14 stops. Specifically, the tapered portion 14*g* stops inside the hole portion 81 in a state where a cross section having a diameter equal to the diameter D1 of the end 81*a* among cross sections that are perpendicular to the longitudinal direction X and that are located between the front end and the rear end of the tapered portion 14*g*, and the end 81*a* overlap each other in the longitudinal direction X.

As described above, in an optical connector 1A according to the modification example, the minimum diameter of the end 83*b* is longer than the longest diagonal line L of the flange portion 14*d*. Therefore, when the flange portion 14*d* passes through the end 83*b*, the flange portion 14*d* is smoothly inserted into the hole portion 83 without coining into contact with the contours of the end 83*b*. In addition, the six contours S3 of the end 83*b* corresponding respectively to the six sides S1 of the end 83*a* bulge inward, and the hole portion 83 is continuously reduced in diameter from the end 83*b* toward the end 83*a*. Therefore, when the flange portion 14*d* is further inserted, the flange portion 14*d* rotates along the inclined surface located between the six contours S3 of the end 83*b* and the six sides S1 of the end 83*a*, so that the positions of the corners of the flange portion 14*d* are aligned with the positions of the vertices of the shape of the end 83*a*. Therefore, when the optical connector 1A is manufactured in a factory or the like, when the ferrule 14 of the finished optical connector 1A is pushed into the front housing 10A and is rotated and adjusted, when the ferrule 14 is pushed into the front housing 10A in a case where a tip of an optical fiber is cleaned by a cleaner, or the like, the corners of the flange portion 14*d* are prevented from being caught on the end 83*b* of the hole portion 83 when the ferrule 14 is pulled forward from the front housing 10A. As a result, the frequency of occurrences of the retraction of the ferrule 14 is reduced. In addition, since the shape of a cross section of the end 83*b* perpendicular to the longitudinal direction X is a substantially star shape, a shape in which the six contours S3 of the end 83*b* corresponding respectively to the six sides S1 of the end 83*a* bulge inward can be realized by a simple shape. Therefore, the ease of processing the front housing 10A can be improved.

The embodiment of the present disclosure has been described above in detail, but the present invention is not limited to the embodiment and can be applied to various embodiments. For example, in the embodiment, an example in which the shape of the rear end of the hole portion 82 or 83 is a circular shape or a substantially star shape, but the shape of the rear end of the hole portion 82 or 83 is not limited to a circular shape or a substantially star shape, and may be any shape as long as the shape is such that the six contours S2 or S3 corresponding respectively to the six sides S1 of the front end of the hole portion 82 or 83 bulge outward or inward.

What is claimed is:

1. An optical connector which has a front end and a rear end located opposite the front end in a first direction, and into which an optical fiber is insertable from the rear end, the connector comprising:
   a ferrule including a flange portion having a regular hexagonal prism shape, and holding the optical fiber at the front end; and
   a front housing having a through-hole into which the flange portion is inserted, and accommodating the ferrule,
   wherein the through-hole includes a first hole portion and a second hole portion that is continuous from the first hole portion,
   the second hole portion is located between the first hole portion and the rear end in the first direction,
   a shape of a cross section of the first hole portion perpendicular to the first direction is a regular hexagonal shape,
   the first hole portion has a first end close to the front end of the optical connector, and a second end close to the rear end of the optical connector,
   the first hole portion is continuously reduced in diameter from the second end toward the first end,
   a longest diagonal line at the first end of the first hole portion is shorter than a longest diagonal line of the flange portion,
   a longest diagonal line at the second end of the first hole portion is longer than the longest diagonal line of the flange portion,
   a distance between opposite sides at the second end of the first hole portion is shorter than the longest diagonal line of the flange portion,
   the second hole portion has a third end close to the front end, and a fourth end close to the rear end,
   a shape of a cross section of the third end of the second hole portion perpendicular to the first direction is same as a shape of a cross section of the second end of the first hole portion perpendicular to the first direction,
   in a cross section of the fourth end of the second hole portion perpendicular to the first direction, six contours corresponding respectively to six sides of the third end of the second hole portion bulge outward or inward,
   a minimum diameter of the fourth end of the second hole portion is longer than the longest diagonal line of the flange portion, and
   the second hole portion is continuously reduced in diameter from the fourth end toward the third end.

2. The optical connector according to claim 1, wherein a shape of the cross section of the fourth end of the second hole portion perpendicular to the first direction is a circular shape.

3. The optical connector according to claim 1, wherein a shape of the cross section of the fourth end of the second hole portion perpendicular to the first direction is a substantially star shape.

4. The optical connector according to claim 3, wherein the second hole portion includes a first portion including the third end, and a second portion including the fourth end, and
   an inclination angle of a generating line of the second portion with respect to an axis of the second hole portion is larger than an inclination angle of a generating line of the first portion with respect to the axis.

5. The optical connector according to claim 1, further comprising:
- an inner housing having a space inside and being connected to a rear end of the front housing, the space accommodating the optical fiber,
- wherein the front housing includes a pair of opening portions provided on both side surfaces of the front housing, and
- the inner housing includes a pair of latches provided at a front end portion of the inner housing to be inserted and engage with the pair of opening portions of the front housing from an inside.

6. The optical connector according to claim 5, further comprising:
- an outer housing that accommodates the inner housing inside,
- wherein the inner housing is detachably connected to an inside of the outer housing.

7. The optical connector according to claim 1,
- wherein the front housing is made of synthetic resin and the flange portion is made of metal.

8. The optical connector according to claim 1,
- wherein the ferrule includes a ferrule body located close to a front end of the ferrule, and a metal member which is located close to a rear end of the ferrule and to which the ferrule body is inserted and fixed, and
- the metal member includes the flange portion.

* * * * *